US010722986B2

(12) United States Patent
Barhorst et al.

(10) Patent No.: US 10,722,986 B2
(45) Date of Patent: Jul. 28, 2020

(54) SYSTEMS AND METHODS FOR LOW-MANGANESE WELDING WIRE

(71) Applicant: Hobart Brothers LLC, Troy, OH (US)

(72) Inventors: Steven Edward Barhorst, Sidney, OH (US); Mario Anthony Amata, Dublin, OH (US); Susan Renata Fiore, Dublin, OH (US)

(73) Assignee: HOBART BROTHERS LLC, Troy, OH (US)

( * ) Notice: Subject to any disclaimer, the term of this patent is extended or adjusted under 35 U.S.C. 154(b) by 428 days.

(21) Appl. No.: 15/359,032

(22) Filed: Nov. 22, 2016

(65) Prior Publication Data

US 2017/0165793 A1    Jun. 15, 2017

Related U.S. Application Data

(60) Provisional application No. 62/266,381, filed on Dec. 11, 2015.

(51) Int. Cl.
*B23K 35/02* (2006.01)
*B23K 35/36* (2006.01)
(Continued)

(52) U.S. Cl.
CPC .......... *B23K 35/0266* (2013.01); *B23K 9/042* (2013.01); *B23K 9/173* (2013.01);
(Continued)

(58) Field of Classification Search
CPC .............. B23K 35/3608; B23K 35/368; B23K 35/406; B23K 2103/04; B23K 35/3601;
(Continued)

(56) References Cited

U.S. PATENT DOCUMENTS 2,798,824 A * 7/1957 Kihlgren .............. B22D 11/049
428/386
2,870,047 A * 1/1959 Kee ...................... B23K 35/365
219/146.52
(Continued)

FOREIGN PATENT DOCUMENTS

CN          87103887       12/1988
CN          102139424       8/2011
(Continued)

OTHER PUBLICATIONS

American Welding Online, "Efforts to Reduce Manganese Fume Emissions During Flux Cored Arc Welding of Standard Carbon Steels," posted Apr. 16, 2014 at 11:53 am, http://awo.aws.org/2014/04/efforts-to-reduce-manganese-fume-emissions-during-flux-cored-arc-welding-of-standard-carbon-steels/.
(Continued)

*Primary Examiner* — Dana Ross
*Assistant Examiner* — Kuangyue Chen
(74) *Attorney, Agent, or Firm* — McAndrews, Held & Malloy, Ltd.

(57) ABSTRACT

The present disclosure relates generally to welding and, more specifically, to electrodes for arc welding, such as Gas Metal Arc Welding (GMAW) or Flux Core Arc Welding (FCAW). A welding consumable includes a metallic sheath surrounding a granular core. The welding consumable includes: approximately 0.35 wt % or less manganese, between approximately 0.1 wt % and approximately 3 wt % nickel, between approximately 2.5 wt % and approximately 10 wt % calcined rutile; and between approximately 0.1 wt % and approximately 2 wt % spodumene, all based on the weight of the welding consumable.

26 Claims, 2 Drawing Sheets

(51) Int. Cl.
    *B23K 35/368*         (2006.01)
    *B23K 35/40*          (2006.01)
    *B23K 9/173*          (2006.01)
    *B23K 9/04*           (2006.01)
    *B23K 103/04*        (2006.01)
    *B23K 101/06*        (2006.01)

(52) U.S. Cl.
    CPC ........ *B23K 35/3601* (2013.01); *B23K 35/368* (2013.01); *B23K 35/3608* (2013.01); *B23K 35/406* (2013.01); *B23K 2101/06* (2018.08); *B23K 2103/04* (2018.08)

(58) Field of Classification Search
    CPC . B23K 9/042; B23K 2101/06; B23K 35/0266
    USPC ...................................................... 219/137
    See application file for complete search history.

(56) References Cited

U.S. PATENT DOCUMENTS

| | | |
|---|---|---|
| 3,162,751 A | 12/1964 | Robbins |
| 3,195,230 A | 7/1965 | Peck |
| 3,362,811 A | 1/1968 | Heuschkel |
| 3,405,248 A | 10/1968 | Essers |
| 3,513,289 A | 5/1970 | Blake |
| 3,529,996 A | 9/1970 | David |
| 3,702,390 A | 11/1972 | Blake |
| 3,725,054 A | 4/1973 | Perfect |
| 3,745,294 A | 7/1973 | Arikawa |
| 3,767,891 A | 10/1973 | Haverstraw |
| 3,786,676 A | 1/1974 | Korolyshun |
| 3,800,120 A * | 3/1974 | Helton ................ B23K 35/368 219/146.31 |
| 3,843,867 A | 10/1974 | Helton |
| 3,848,109 A | 11/1974 | Zvanut |
| 3,868,491 A | 2/1975 | Ito |
| 4,010,309 A | 3/1977 | Petersen |
| 4,045,593 A | 8/1977 | Hill |
| 4,110,514 A | 8/1978 | Nicholson |
| 4,122,238 A | 10/1978 | Frantzerb, Sr. |
| 4,125,758 A | 11/1978 | Oishi |
| 4,131,784 A | 12/1978 | Kimura |
| 4,160,066 A | 7/1979 | Szumachowski |
| 4,282,420 A | 8/1981 | Banks |
| 4,343,984 A | 8/1982 | Smith |
| 4,430,122 A | 2/1984 | Pauga |
| 4,449,031 A | 5/1984 | Kotecki |
| 4,517,441 A | 5/1985 | Kaljee |
| 4,551,610 A | 11/1985 | Amata |
| 4,584,459 A | 4/1986 | Merrick |
| 4,833,296 A | 5/1989 | Crockett |
| 4,843,212 A | 6/1989 | Shneerov |
| 4,940,882 A * | 7/1990 | Bates ................ B23K 35/368 219/146.22 |
| 5,365,036 A | 11/1994 | Crockett |
| 5,369,244 A | 11/1994 | Kulikowski |
| 5,389,583 A * | 2/1995 | Schulze ................ C04B 35/111 264/679 |
| 5,438,083 A | 8/1995 | Takimoto |
| 5,686,002 A | 11/1997 | Flood |
| 5,824,992 A | 10/1998 | Nagarajan |
| 5,857,141 A | 1/1999 | Keegan |
| 6,242,113 B1 | 6/2001 | Kiser |
| 6,339,209 B1 | 1/2002 | Kotecki |
| 6,674,047 B1 | 1/2004 | Hughes |
| 6,723,954 B2 | 4/2004 | Nikodym |
| 6,784,401 B2 | 8/2004 | North |
| 6,835,913 B2 | 12/2004 | Duncan |
| 6,940,042 B2 | 9/2005 | Hara |
| 7,087,860 B2 | 8/2006 | Nikodym |
| 7,091,448 B2 | 8/2006 | North |
| 8,758,901 B2 | 6/2014 | Nakamura |
| 9,764,429 B2 | 9/2017 | Chen |
| 2001/0008235 A1 | 7/2001 | Miszczak |
| 2004/0020912 A1 | 2/2004 | Hara |
| 2004/0026396 A1 | 2/2004 | Nikodym |
| 2005/0189337 A1* | 9/2005 | Baune ................ B23K 35/3608 219/145.23 |
| 2006/0151453 A1 | 7/2006 | Gordon |
| 2006/0163231 A1 | 7/2006 | Kobayashi |
| 2006/0165552 A1 | 7/2006 | Kapoor |
| 2006/0207984 A1 | 9/2006 | Karogal |
| 2006/0219685 A1 | 10/2006 | Karogal |
| 2006/0255026 A1 | 11/2006 | North |
| 2007/0017956 A1 | 1/2007 | Karogal |
| 2007/0193995 A1 | 8/2007 | Kapoor |
| 2008/0057341 A1 | 3/2008 | Bouillot |
| 2008/0272100 A1 | 11/2008 | Amata |
| 2009/0045172 A1 | 2/2009 | VanErk |
| 2009/0298024 A1 | 12/2009 | Batzler |
| 2010/0101780 A1 | 4/2010 | Ballew |
| 2010/0224610 A1 | 9/2010 | Wallace |
| 2011/0316516 A1 | 12/2011 | Schiefermuller |
| 2012/0057240 A1 | 3/2012 | Sundell |
| 2013/0313240 A1 | 11/2013 | Amata |
| 2014/0083981 A1* | 3/2014 | Amata ................ B23K 9/173 219/74 |
| 2014/0097168 A1 | 4/2014 | Ferree |
| 2014/0349136 A1 | 11/2014 | Barhorst |

FOREIGN PATENT DOCUMENTS

| | | |
|---|---|---|
| CN | 102233497 | 11/2011 |
| CN | 102581513 | 7/2012 |
| CN | 103418940 A * | 12/2013 |
| CN | 103418940 B * | 5/2015 |
| DE | 4112371 | 10/1992 |
| DE | 9319668 | 4/1995 |
| DE | 102010026894 | 1/2012 |
| EP | 0012728 | 6/1980 |
| EP | 0688630 | 12/1995 |
| EP | 1226897 | 7/2002 |
| EP | 1728584 | 12/2006 |
| EP | 1775060 | 4/2007 |
| EP | 2343149 | 7/2011 |
| EP | 2567776 | 3/2013 |
| EP | 2855081 | 4/2015 |
| GB | 739375 | 10/1955 |
| GB | 1143600 | 2/1969 |
| GB | 1183463 | 3/1970 |
| GB | 2204324 | 11/1988 |
| JP | S5794626 | 6/1982 |
| JP | S58196192 | 11/1983 |
| JP | S6167597 | 4/1986 |
| JP | 04075783 A * | 3/1992 |
| JP | H0475783 | 3/1992 |
| JP | H1123434 | 1/1999 |
| JP | 2003266194 | 9/2003 |
| RU | 2253556 | 6/2005 |
| WO | 9934950 | 7/1999 |
| WO | 0163974 | 8/2001 |
| WO | 0212581 | 2/2002 |
| WO | 2013177480 | 11/2013 |
| WO | 2014058725 | 4/2014 |

OTHER PUBLICATIONS

American Welding Society F1.2:2006, Laboratory Method for Measuring Fume Generation Rate and Total Fume Emission of Welding and Allied Processes, Jan. 28, 2006, pp. 4-6.
American Welding Society F3.2M/F3.2:2001, Ventilation Guide for Weld Fume, Annex B, C, and D, Jan. 1, 2001, pp. 21-26.
Guide for Estimating Welding Emissions for EPA and Ventilation Permit Reporting, American Welding Society F1.6:2003, Feb. 25, 2003, 6 pgs.
International Search Report from PCT application No. PCT/US2013/042565, dated Sep. 13, 2013, 14 pgs.
International Search Report from PCT application No. PCT/US2014/036507, dated Feb. 16, 2015, 11 pgs.
International Search Report from PCT application No. PCT/US2014/053020, dated Nov. 18, 2014, 14 pgs.

(56) References Cited

OTHER PUBLICATIONS

International Search Report from PCT application No. PCT/US2014/063844, dated Jan. 27, 2015, 13 pgs.
International Search Report from PCT application No. PCT/US2015/039451, dated Dec. 2, 2015, 13 pgs.
International Search Report from PCT application No. PCT/US2015/041462, dated Dec. 4, 2015, 14 pgs.
International Search Report from PCT application No. PCT/US2016/065717, dated Feb. 7, 2017, 14 pgs.
Safety in Welding, Cutting, and Allied Processes, An American National Standard, American Welding Society, Mar. 9, 2012, pp. 1-70.
Canadian Office Action Appln No. 2,955,351 dated Feb. 3, 2018 (4 pgs).
International Search Report Appln. No. PCT/US2014/063844, dated Jan. 27, 2015, 12 pages.
Canadian Office Action Appln No. 3,005,360 dated Mar. 19, 2019.

* cited by examiner

SYSTEMS AND METHODS FOR LOW-MANGANESE WELDING WIRE

CROSS-REFERENCE TO RELATED APPLICATIONS

This application claims priority from and the benefit of U.S. Provisional Application Ser. No. 62/266,381, entitled "SYSTEMS AND METHODS FOR LOW-MANGANESE WELDING WIRE," filed Dec. 11, 2015, which is hereby incorporated by reference in its entirety for all purposes.

BACKGROUND

The present disclosure relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), Self-shielded Flux Core Arc Welding (FCAW-S), and Submerged Arc Welding (SAW)), typically employ a welding electrode in the form of welding wire. Welding wire may generally provide a supply of filler metal for the weld as well as provide a path for the current during the welding process.

BRIEF DESCRIPTION

In an embodiment, a welding consumable includes a metallic sheath surrounding a granular core. The welding consumable includes: approximately 0.35 wt % or less manganese based on the weight of the welding consumable; between approximately 0.1 wt % and approximately 3 wt % nickel based on the weight of the welding consumable; between approximately 2.5 wt % and approximately 10 wt % calcined rutile based on the weight of the welding consumable; and between approximately 0.1 wt % and approximately 2 wt % spodumene based on the weight of the welding consumable.

In another embodiment, a method of forming a weld deposit on a structural steel workpiece includes feeding a tubular welding wire toward the structural steel workpiece, wherein the structural steel workpiece comprises carbon steel, mild steel, low-alloy steel, or a combination thereof. The tubular welding wire includes: approximately 0.35 wt % or less manganese based on the weight of the welding consumable; between approximately 0.1 wt % and approximately 3 wt % nickel based on the weight of the welding consumable; between approximately 2.5 wt % and approximately 10 wt % calcined rutile based on the weight of the welding consumable; and between approximately 0.1 wt % and approximately 2 wt % spodumene based on the weight of the welding consumable. The method includes forming the weld deposit on the structural steel workpiece using the tubular welding wire, wherein the weld deposit comprises approximately 0.35 wt % manganese or less based on the weight of the weld deposit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
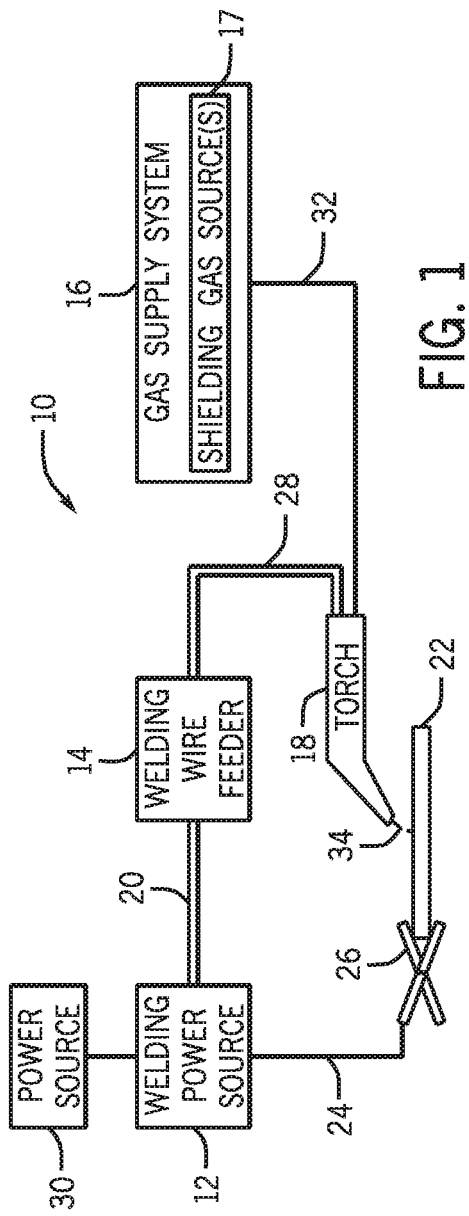
FIG. 1 is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "welding wire" may refer to any welding wire, rod, stick, or other suitable welding consumable, including tubular welding wires (e.g., metal-cored welding wire, flux-cored welding wire). It should be appreciated that, as used herein, the term "tubular welding wire" may refer to any welding wire having a metal sheath and a granular or powdered core, such as metal-cored or flux-cored welding wires. It should be appreciated that the term "tubular," as used herein, may include various shapes of welding wire, including round, elliptical, square, polygonal, or any other suitable shape. Furthermore, as used herein, "approximately" or "substantially" may generally refer to an approximate value that may, in certain embodiments, represent a difference (e.g., higher or lower) of less than 0.01%, less than 0.1%, or less than 1% from the actual value. That is, an "approximate" value may, in certain embodiments, be accurate to within (e.g., plus or minus) 0.01%, within 0.1%, or within 1% of the stated value. The term, "substantially free," as used herein, is used to describe a composition from which an identified substance is completely absent or is only present in trace amounts (e.g., less than 0.05 wt %, less than 0.01 wt %, less than 0.005 wt %).

Certain types of welding wire (e.g., tubular welding wire) may include one or more components (e.g., flux, arc stabilizers, or other additives) that may generally alter the welding process and/or the properties of the resulting weld. For example, certain types of welding wires may include a substantial quantity of manganese (Mn) (e.g., greater than 1% by weight) to function as a deoxidizer and/or an alloying metal for the resulting weld. That is, this manganese content may react with oxygen near the welding environment to form oxides of manganese (e.g., manganese oxide (MnO) and/or manganese dioxide ($MnO_2$)) that flow into the slag and/or transfer into the weld pool, incorporated into the weld metal as an inclusion within the resulting weld. In general, manganese may form alloys with certain metals (e.g., steel) to provide improved strength, ductility, and toughness. In certain environments, manganese may act as a deoxidizer, reacting with oxygen (e.g., from the atmosphere) in order to block (e.g., limit or prevent) this oxygen from remaining in the weld deposit. Similarly, manganese may react with and remove sulfur from the welding environment. Furthermore, manganese in a welding wire may help to control the weld puddle (e.g., by improving the wetting of the workpiece).

However, despite these positive effects, it may be desirable, in certain situations, to utilize a low-manganese welding wire. For example, a welding wire having low manganese content (e.g., less than 1 wt %, less than 0.5 wt %, less than 0.35 wt %, less than 0.3 wt %, less than 0.25 wt %, less than 0.2 wt %, less than 0.15 wt % manganese, or only including trace amounts, such as 0.01 wt % or less manganese) may volatilize only a small quantity of manganese during the welding operation. Accordingly, the present disclosure is directed toward systems and methods for welding wires having low manganese content that may be used to produce welds having a low manganese content (e.g., less than approximately 0.5 wt %, less than approximately 0.4 wt %, less than approximately 0.3 wt %, or less than approximately 0.2 wt %, less than 0.15 wt % manganese, or only including trace amounts, such as 0.01 wt % or less manganese) while still providing suitable weld properties (e.g., tensile strength, ductility, toughness, and so forth) when welding structural steel (e.g., mild steels, low-alloy steels, carbon steels, or other suitable structural steel) workpieces. In other words, the presently disclosed welding wires generally maintain the weld quality (e.g., a weld having a reasonable level of inclusions, good strength, and/or good toughness) when welding structural steels, despite the reduced manganese content in the resulting weld deposit. Additionally, for certain disclosed welding wire embodiments, less than approximately 1 wt % of the welding wire is converted into welding fumes during welding operations. Moreover, certain disclosed embodiments include one or more lithium sources (e.g., lithium carbonate and/or spodumene) that serve a unique role of stabilizing the weld pool and creating what is believed to be a high arc pressure, which improves weld bead shape, particularly for vertical-up welding.

During the welding operation, the disclosed tubular welding wire enables the weld bead to smoothly wet into the side walls, forming a weld deposit having excellent toughness and excellent matching strength to the base material. That is, the disclosed tubular welding wire enables the welder to duplicate the strength, ductility, toughness and hardness specifications of qualified joint procedures on structural steel workpieces, enabling the welder to attain X-ray quality welds. Certain embodiments of the disclosed tubular welding wire also enable an easily removable slag (e.g., nearly self-removing slag) for easy cleaning and pre-painting preparation of the workpiece. The disclosed tubular welding wire enables nearly spatter-free weld operation when using argon and high argon/carbon dioxide shielding gas mixtures. The relatively low oxidation potential of the shielding gases (e.g., carbon dioxide ($CO_2$) and/or argon (Ar)) and the vapor pressure control of the disclosed welding system enable an exceedingly low fume generation rate for an open arc semi-automatic welding processes. This reduced fume rate enhances arc clarity, enabling welders to perform to their highest skill level. Further, for certain embodiments, the substantial or complete absence (e.g., trace quantities, such as 0.05 wt %, or less) of manganese metal powder in the granular core formulation, in addition the substantial or complete absence (e.g., trace quantities, such as 0.05 wt %, or less) of manganese in the metal sheath, may significantly lessen the concentration of manganese in these welding fumes. That is, in certain embodiments, the disclosed tubular welding wire enables significantly lower manganese fume emission rates per pound of welding electrode consumed when compared to other welding electrodes.

Turning to the figures, FIG. 1 illustrates an embodiment of a gas metal arc welding (GMAW) system 10 that utilizes tubular welding wire, in accordance with the present disclosure. It should be appreciated that, while the present discussion may focus specifically on the GMAW system 10 illustrated in FIG. 1, the presently disclosed welding wire may benefit a number of different welding processes (e.g., FCAW-S, FCAW-G, GTAW, SAW, or similar welding processes) that use a welding wire or similar welding consumable. The illustrated welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20. The welding power source 12 may also be coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (e.g., the welding electrode) and power to the welding torch 18 during operation of the welding system 10. In another embodiment, the welding power source 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. For example, in certain embodiments, the power source 30 may be a constant voltage (CV) power source 30. The welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed tubular welding wire may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. In other embodiments, such as certain FCAW-S and SAW systems that do not rely on an externally supplied shielding gas, the welding system 10 may not include the gas supply system 16. A shielding gas, as used herein, may refer to any gas or mixture of gases (e.g., inert or active gasses) that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth).

In certain embodiments, the shielding gas flow may be a shielding gas or shielding gas mixture (e.g., argon (Ar), helium (He), carbon dioxide ($CO_2$), oxygen ($O_2$), nitrogen ($N_2$), hydrogen ($H_2$), similar suitable shielding gases, or any mixtures thereof). For example, a shielding gas flow (e.g., delivered via the gas conduit 32) may include Ar, $CO_2$, Ar/$CO_2$ mixtures (e.g., 75% Ar and 25% $CO_2$, 90% Ar and 10% $CO_2$, 95% Ar and 5% $CO_2$, and so forth), Ar/$CO_2$/$O_2$ mixtures, Ar/He mixtures, and so forth. Further, it may be appreciated that, as set forth in detail below, certain shielding gases (e.g., certain Ar/$CO_2$ mixtures, such as 90% Ar/10% $CO_2$) may reduce a total amount of welding fumes that may be generated during the welding operation. For example, in certain embodiments, the shielding gas flow may include between approximately 0% and 100% $CO_2$, with the remainder of the shielding gas flow being argon, helium, or another suitable gas. In certain embodiments, shielding gas flows including three or more gases (e.g., trimix) are also presently contemplated.

Accordingly, the illustrated welding torch 18 generally receives the tubular welding wire from the welding wire feeder 14, power from the welding power source 12, and a shielding gas flow from the gas supply system 16 in order to perform GMAW of the workpiece 22. In certain embodiments, the welding wire feeder 14 may be a constant speed or variable speed welding wire feeder 14. During operation, the welding torch 18 may be brought near the workpiece 22 so that an arc 34 may be formed between the consumable welding electrode (i.e., the welding wire exiting a contact tip of the welding torch 18) and the workpiece 22. In certain embodiments, the welding torch 18 and welding wire feeder 14 may be configured to provide a nearly constant contact tip-to-workpiece distance of between approximately 0.75 inch and approximately 1 inch. Additionally, as discussed below, by controlling the composition of the tubular welding wire, the chemical and mechanical properties of the resulting weld may be varied. For example, the tubular welding wire may include a deoxidizing component to react with and remove undesired species (e.g., oxygen, metal oxides, or other undesired oxygen species) from the weld environment. In certain embodiments, the tubular welding wire may further include alloying components to contribute species (e.g., silicon, nickel, or other suitable alloying components) to the weld pool, affecting the mechanical properties (e.g., strength and toughness) of the weld. Furthermore, certain components of the tubular welding wire may also provide additional shielding atmosphere near the arc 34, affect the transfer properties of the arc 34, clean the surface of the workpiece 22, and so forth.

Figure 2:
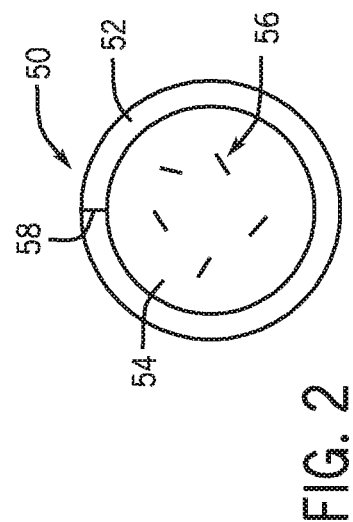
FIG. 2 is a cross-sectional view of a tubular welding wire, in accordance with embodiments of the present disclosure.

A cross-section of an embodiment of the presently disclosed welding wire is illustrated in FIG. 2. FIG. 2 illustrates a tubular welding wire 50 (e.g., welding electrode 50) having a metallic sheath 52 that encapsulates a granular or powdered core 54, which may also be referred to as filler. The metallic sheath 52 may be manufactured from any suitable metal or alloy (e.g., low-carbon steel, low-alloy steel, or other suitable metal or alloy). In certain embodiments, the metal sheath 52 may provide between approximately 70% and approximately 90% of the total weight of the tubular welding wire 50. The metallic sheath 52 may include additives or impurities (e.g., carbon, manganese, silicon, nickel, aluminum, or similar compounds or elements) that may be selected to provide desired properties for the tubular welding wire 50 and the weld deposit. For example, certain embodiments of the tubular welding wire 50 may include a metallic sheath 52 having less than approximately 0.03% carbon by weight. In other embodiments, the metallic sheath 52 may include between approximately 0.02% and approximately 0.16% carbon by weight.

In certain embodiments, the metallic sheath 52 of the tubular welding wire 50 may include relatively low manganese content. For example, in certain embodiments, the metallic sheath 52 may include between approximately 0.01 wt % and approximately 0.5 wt % manganese (e.g., between approximately 0.01 wt % and approximately 0.15 wt %, between approximately 0.01 wt % and approximately 0.2 wt %, between approximately 0.15 wt % and approximately 0.2 wt %, between approximately 0.02 wt % and approximately 0.35 wt %, between approximately 0.2 wt % and approximately 0.35 wt %), while the granular core 54 may be completely free or substantially free from manganese (e.g., including little or no metallic manganese metal or alloys and/or including little or no manganese compounds). For example, in certain embodiments, the granular core 54 may include less than 0.1 wt %, less than 0.05 wt %, less than 0.04 wt %, less than 0.03 wt %, less than 0.02 wt %, less than 0.01 wt %, or approximately 0 wt % (e.g., none or only trace impurity quantities) manganese or manganese compounds (e.g., manganese oxides). As such, a number of the presently disclosed tubular welding wire embodiments have a manganese content (e.g., manganese metal or alloys, or manganese compounds, or both) less than approximately 1%, less than approximately 0.5%, less than approximately 0.4%, or between approximately 0.2 wt % and approximately 0.3 wt %. Further, in certain embodiments, the metallic sheath 52 may be completely free or substantially free of (e.g., none or only trace impurity quantities, such as 0.05 wt % or less) manganese alloys. Also, in certain embodiments, the metallic sheath 52 may include between approximately 0.01 wt % and approximately 0.5 wt % nickel, which may reduce the amount of nickel present in the granular core 54 for certain core formulations.

The granular core 54 of the tubular welding wire 50 may generally be a compacted powder with a composition that, as discussed below, includes various components that each may serve at least one role as an alloying component, arc stabilizer, slag forming component, deoxidizer, and/or filler during the welding process. These components of the granular core 54 may be homogenously or non-homogenously (e.g., in clumps or clusters 56) disposed within the granular core 54. In certain embodiments, the granular core 54 may provide between approximately 10% and approximately 30% of the total weight of the tubular welding wire 50. Furthermore, as discussed in detail below, in certain embodiments, one or more components (e.g., certain arc stabilizing and/or slag forming components) may be prepared and included in the granular core 54 as agglomerates (e.g., sintered and/or formed into frits). It should be noted that the term "agglomerate" or "frit," as used herein, refers to a mixture of compounds that have been fired or heated in a calciner or oven such that the components of the mixture are in intimate contact with one another. It should be appreciated that the agglomerate or frit may have subtly or substantially different chemical and/or physical properties than the individual components of the mixture used to form the agglomerate. For example, an agglomerate may generally be better suited for the weld environment (e.g., drier and/or better powder flow) than a non-agglomerated form of the same component.

Tables 1 and 2 indicate the compositions of four example embodiments of the tubular welding wire 50, namely E70T1-GC, E71T1-GC, E70T1-GM, and E71T1-GM, wherein the embodiments are identified by their respective AWS classification. It may be appreciated that the AWS standards allow for certain variations in the composition, wherein welding wires that vary from the standard (e.g., by possessing a lower manganese content, as presently disclosed) can receive a G-type classification. Table 1 indicates the chemical composition of the metallic sheath 52, while Table 2 indicates the ingredients of the granular core 54, for these four example welding wire embodiments. It may be appreciated that these embodiments of the welding wire 50 may be classified according to (e.g., may at least partially comply with) one or more AWS standards (e.g., AWS A5.20, A5.29, or A5.36).

For the embodiments indicated in Table 1, the metallic sheath 52 may include between approximately 0.2 wt % and approximately 0.4 wt % (e.g., approximately 0.35 wt %) manganese. As noted above, in other embodiments, the metallic sheath 52 may include other target amounts (e.g., approximately 0.2 wt %, approximately 0.3 wt %, approximately 0.25 wt %, approximately 0.2 wt %, approximately 0.15 wt %) of manganese. For these embodiments, the metallic sheath 52 may account for between approximately 75% and approximately 87.5% of the weight of the tubular welding wire 50. It may be appreciated that embodiments of the tubular welding wire 50 having a higher fill (e.g., granular core 54 contributing greater than about 15% of the weight of the tubular welding wire 50) may draw less current at a given wire feed speed and/or enable higher melt-off rates at a given current than welding wires with lower core loading (e.g., granular core 54 contributing approximately 15% or less of the weight of the tubular welding wire 50). As such, in certain embodiments, since welding fumes may be generated at a rate proportional to the applied electric power, the tubular welding wires 50 having higher core loading may enable both lower power consumption and fewer welding fumes (e.g., at equal melt rate) when compared to tubular welding wires 50 having lower core loading.

TABLE 1

Chemical composition of the metallic sheath 52 for four embodiments of the presently disclosed welding wire. Values are presented as weight percentages of the sheath and of the entire welding wire.

|  | E70T1-GC | | E71T1-GC | | E70T1-GM | | E71T1-GM | |
| --- | --- | --- | --- | --- | --- | --- | --- | --- |
|  | wt % sheath | wt % wire | wt % sheath | wt % wire | wt % sheath | wt % wire | wt % sheath | wt % wire |
| Carbon | 0.03 | 0.02 | 0.02 | 0.02 | 0.02 | 0.015 | 0.02 | 0.02 |
| Iron | 99.68 | 77.75 | 99.67 | 84.72 | 99.60 | 74.7 | 99.68 | 87.22 |
| Manganese | 0.29 | 0.23 | 0.31 | 0.26 | 0.31 | 0.23 | 0.30 | 0.26 |
| Aluminum | 0 | 0 | 0 | 0 | 0.05 | 0.04 | 0 | 0 |
| Silicon | 0 | 0 | 0 | 0 | 0.02 | 0.015 | 0 | 0 |
| Total | 100 | 78 | 100 | 85 | 100 | 75 | 100 | 87.5 |

TABLE 2

Example formulations for the granular core 54 for the four embodiments of the tubular welding wire 50 indicated on Table 1. Values are in weight percent relative to the weight of the granular core 54 and relative to the weight of the entire tubular welding wire 50.

|  |  | E70T1-GC | | E71T1-GC | | E70T1-GM | | E71T1-GM | |
| --- | --- | --- | --- | --- | --- | --- | --- | --- | --- |
| Primary Role | Component | wt % core | wt % wire | wt % core | wt % wire | wt % core | wt % wire | wt % core | wt % wire |
| Alloying | Nickel metal powder | 8.3 | 1.83 | 9.4 | 1.41 | 6.3 | 1.58 | 12.5 | 1.56 |
|  | Iron metal powder | 41.7 | 9.17 | 13.7 | 2.06 | 51.7 | 12.93 | 0 | 0 |
| Arc Stabilizing | Iron oxide | 3.5 | 0.77 | 0 | 0 | 3.1 | 0.78 | 7.3 | 0.91 |
|  | Potassium fluorosilicate | 0 | 0 | 1 | 0.15 | 0 | 0 | 0 | 0 |
|  | Sodium titanate frit | 4.5 | 0.99 | 14 | 2.1 | 4 | 1 | 4.3 | 0.54 |
|  | Lithium carbonate | 0.6 | 0.13 | 0 | 0 | 0.5 | 0.13 | 0.7 | 0.09 |
|  | Spodumene powder | 2.8 | 0.62 | 1.3 | 0.20 | 2.5 | 0.63 | 7.7 | 0.96 |
|  | Nepheline syenite | 0 | 0 | 3.6 | 0.54 | 0 | 0 | 0 | 0 |
| Slag Forming | Silica sand (99% SiO$_2$) | 3.7 | 0.81 | 0 | 0 | 3 | 0.75 | 0 | 0 |
|  | Wallastonite | 0.6 | 0.13 | 0 | 0 | 0.5 | 0.13 | 0 | 0 |
|  | Calcined granular rutile | 24.1 | 5.30 | 41 | 6.15 | 20.3 | 5.08 | 49.3 | 6.16 |
| Deoxidizing | Ferro-silicon powder (50% grade, unstabilized) | 9.2 | 2.02 | 11.5 | 1.73 | 7.1 | 1.78 | 13 | 1.63 |
|  | Aluminum metal powder | 1 | 0.22 | 0 | 0 | 0 | 0 | 0.7 | 0.09 |
|  | Magnesium metal powder | 0 | 0 | 3 | 0.45 | 0 | 0 | 2.5 | 0.31 |
|  | Ferro-zirconium-silicon powder | 0 | 0 | 1.5 | 0.23 | 1 | 0.25 | 2 | 0.25 |
|  | Total: | 100 | 22 | 100 | 15 | 100 | 25 | 100 | 12.5 |

In terms of the granular core 54, it should be appreciated that, while each component in Table 2 is indicated as serving a primary role (e.g., as an alloying agent, arc stabilizer, slag former, deoxidizer, or filler), each component may actually serve more than one role in the welding process. For example, titanium dioxide ($TiO_2$) may be provided to the weld environment by a sodium titanate frit and/or the calcined granular rutile and may actually provide stability to the arc 34 in addition to aiding in slag formation. By further example, certain deoxidizing components (e.g., aluminum, magnesium) may bind strongly to oxygen, and sometimes nitrogen as well, from the welding atmosphere and form at least a portion of the slag around the weld bead. Similarly, certain deoxidizing components may also bind strongly to sulfur, which may come from the workpiece or from the welding consumable (e.g., as an impurity in the metallic sheath 52 or components of the granular core 54). As such, it should be appreciated that these components may be otherwise classified (e.g., as arc stabilizers, slag forming components, and/or deoxidizers) without altering the present disclosure.

As set forth in Table 2, in certain embodiments, the granular core 54 of the tubular welding wire 50 may include between approximately 10% and approximately 18% alloying components by weight. For example, as set forth in Table 2, certain embodiments of the tubular welding wire 50 may include a granular core 54 having between approximately 5% and approximately 15% nickel and/or between approximately 0% and approximately 50% iron by weight of the core. While these alloying components may otherwise contribute to the welding process (e.g., as arc stabilizers, slag formers, and/or deoxidizers), generally speaking, these alloying components are substantially incorporated (e.g., greater than 90% incorporated) into the weld metal to affect the properties (e.g., strength, ductility, corrosion resistance, and so forth) of the weld bead and the surrounding workpiece 22. By specific example, in certain embodiments, the tubular welding wire 50 may include between approximately 0.1% and 3% (e.g., between 1.4% and 1.9%) nickel, in the metallic sheath 52, the granular core 54, or a combination thereof, based on the weight of the tubular welding wire 50.

Furthermore, as set forth in Table 2, in certain embodiments, the granular core 54 of the tubular welding wire 50 may include between approximately 10% and approximately 20% arc stabilizing components by weight. For example, as set forth in Table 2, certain embodiments of the tubular welding wire 50 may include a granular core 54 having between approximately 0% and approximately 10% iron oxides, between approximately 0% and approximately 1% potassium fluorosilicate, between approximately 4% and approximately 15% sodium titanate frit, between approximately 0% and approximately 1% lithium carbonate, between approximately 1% and approximately 8% spodumene, and between approximately 0% and approximately 4% nepheline syenite based on the weight of the granular core 54. By further, certain embodiments of the tubular welding wire 50 may include a granular core 54 having between approximately 0.05% and approximately 0.3% potassium fluorosilicate, between approximately 0.25% and approximately 4% sodium titanate frit, between approximately 0.05% and approximately 0.25% lithium carbonate, between approximately 0.1% and approximately 2% (e.g., between approximately 0.2% and approximately 1%) spodumene, and between approximately 0.25% and approximately 0.75% nepheline syenite based on the weight of the tubular welding wire 50. Again, while these components may otherwise contribute to the welding process (e.g., as slag formers and/or deoxidizers), these arc stabilizers may generally provide species to the arc that readily ionize, enabling a more consistent and/or controllable arc 34 to the surface of the workpiece 22. The presently disclosed sodium titanate frit may be a sintered mixture of sodium titanate and lithium fluoride and/or sodium silicate that may be better suited for the weld environment (e.g., drier and/or better powder flow) than non-agglomerated sodium titanate. By specific example, an embodiment of a sodium titanate frit may include approximately 11.8% sodium oxide, approximately 5.7% silica, and approximately 82.5% pigment-grade $TiO_2$. Spodumene ($LiAl(SiO_3)_2$) is a mineral that that serves as a lithium source, as well as a source of slagging agents. It is presently recognized that spodumene and/or lithium carbonate, when present in the indicated ranges for certain embodiments, provides a stabilizing effect that is believed to create a high arc pressure, which improves weld bead shape and provides weld pool support for welding in vertical-up positions. Nepheline syenite is a powdered rock that is a mixture of oxides of aluminum, calcium, potassium, sodium, and silicon, and therefore serves as a source of stabilizing ions as well as slagging agents.

Additionally, as set forth in Table 1, in certain embodiments, the granular core 54 of the tubular welding wire 50 may include between approximately 20% and approximately 50% slag forming components by weight. For example, certain embodiments of the presently disclosed welding wire 50 may have a granular core 54 that includes between approximately 0% and approximately 5% silica sand, between approximately 0% and approximately 1% wallastonite, and between approximately 20% and approximately 45% calcined granular rutile. By further example, certain embodiments of the presently disclosed welding wire 50 includes between approximately 0.5% and approximately 1.5% silica sand, between approximately 0.1% and approximately 0.25% wallastonite, and between approximately 3% and approximately 8% calcined granular rutile based on the weight of the tubular welding wire 50. Calcined granular rutile is produced by first milling rutile, and then subsequently baking the milled rutile at a high temperature (e.g., 1450° F.) to remove substantially all of the water contained therein. It may be appreciated that certain embodiments of the presently disclosed welding wire 50 may have a granular core 54 that includes substantially no (e.g., approximately 0%) manganese oxide powder by weight. Accordingly, as set forth in Table 2, in certain embodiments, this may result in tubular welding wires 50 having a total manganese content (e.g., as a metal and/or as a component of a chemical compound) less than approximately 1%, less than approximately 0.5%, less than approximately 0.4%, less than approximately 0.3%, or approximately 0.25% by weight. It may be appreciated that, in other embodiments, higher quality $TiO_2$ sources (e.g., pigment grade $TiO_2$, having less than approximately 0.01% niobium (Nb) or vanadium (V) by weight, or having approximately 0.005 wt % or less Nb and 0.008 wt % or less V, as metal oxides) may be used in alternative to calcined granular rutile, which may improve the properties of the weld deposit and increase the cost of the welding wire. However, it is noted that certain presently disclosed formulations enable the use of calcined rutile in place of the more expensive pigment grade $TiO_2$, enabling acceptable weld deposit characteristics despite the presence of substantially higher levels of oxides of Nb (e.g., Nb content between approximately 0.005 wt % and approximately 0.02 wt %) and V (e.g., V content between approximately 0.005 wt % and approximately 0.008 wt %, or between approximately 0.005 wt % and approximately 0.02 wt %) relative to pigment grade $TiO_2$.

Additionally, as set forth in Table 1, in certain embodiments, the granular core 54 of the tubular welding wire 50 may include between approximately 5% and approximately 20% deoxidizers by weight. For example, certain embodiments of the tubular welding wire 50 may include a granular core 54 having between approximately 5% and approximately 15% ferro-silicon powder (50% grade, unstabilized) (e.g.), between approximately 0% and approximately 1% aluminum metal powder, between approximately 0% and approximately 3% magnesium metal powder, between approximately 0% and approximately 2% ferro-zirconium-silicon powder by weight. By further example, certain embodiments of the tubular welding wire 50 may include a granular core 54 having between approximately 3% and approximately 8% (e.g., between approximately 1% and approximately 4%) ferro-silicon powder, between approximately 0.001% and approximately 0.5% aluminum metal powder, between approximately 0.15% and approximately 1.2% magnesium metal powder, between approximately 0.1% and approximately 0.8% ferro-zirconium-silicon powder by weight of the tubular welding wire 50. While these components may otherwise contribute to the welding process (e.g., as arc stabilizers or slag formers), these deoxidizing components are generally selected to strongly bind oxygen in order to block (e.g., limit or prevent) this oxygen from remaining in the weld pool and weakening the weld deposit.

Table 3 includes chemical and mechanical analysis results for weld deposits formed using the certain welding wire embodiments described in Tables 1 and 2. It should be noted that the elements included in Table 3 include values in the form of weight percentages for a non-exhaustive list of elements; other elements (e.g., Fe) and other trace impurities (e.g., arsenic (As)) may also be present within the weld metal. As such, certain embodiments of the tubular welding wire 50 may form weld deposits having greater than approximately 1.4% (e.g., between approximately 1.4% and approximately 2%, between approximately 1.5% and approximately 1.8%, between approximately 1.6% and approximately 1.7%) nickel by weight. In other embodiments, the tubular welding wire 50 may form weld deposits having between 0.1% and 3% nickel by weight. Furthermore, certain embodiments of the tubular welding wire 50 may form weld deposits having between approximately 0.01% and approximately 0.3%, between approximately 0.05% and approximately 0.25 wt %, between approximately 0.1% and approximately 0.2%, or between approximately 0.16% and approximately 0.18% manganese by weight. Further, the presently disclosed tubular welding wires 50 enable the formation of weld deposits having substantially lower manganese content than weld deposits from other welding wires, while still maintaining good weld properties.

Table 3 also lists mechanical properties for each of the example weld deposits formed using certain of the welding wire embodiments listed in Tables 1 and 2. Specifically, Table 3 includes mechanical property measurements for ultimate tensile strength (UTS), yield strength (YS), percent elongation, and Charpy-V-Notch (CVN) values at −20° C. and −40° C. as determined based on AWS A5.20, A5.36, or another suitable standard. In general, the example weld deposits in Table 3 demonstrate UTS from approximately 70 ksi to approximately 80 ksi, YS from approximately 60 ksi to approximately 70 ksi, percent elongation from approximately 22% to approximately 28%, CVN toughness from approximately 45 ft-lbs to approximately 80 ft-lbs at −20° F., and from approximately 30 ft-lbs to approximately 70 ft-lbs at −40° C. In certain embodiments, the weld deposit demonstrated a CVN toughness of greater than 20 ft-lbs, greater than 30 ft-lbs, greater than 40 ft-lbs, greater than 50 ft-lbs, greater than 65 ft-lbs, greater than 70 ft-lbs, or greater than 75 ft-lbs at −20° C. By further example, in certain embodiments, the weld deposit demonstrated a CVN of greater than 20 ft-lbs, greater than 30 ft-lbs, greater than 40 ft-lbs, greater than 50 ft-lbs, or greater than 60 ft-lbs at −40° C. It should be noted that despite the relatively low manganese content determined for the weld deposits indicated in Table 3 (e.g., approximately 0.2 wt % manganese or less), the weld deposits possess relatively high toughness and a suitable tensile strength for the classification type, as compared to conventional welding wires.

TABLE 3

Example all-weld-metal analyses and mechanical test results for weld deposits formed using the indicated tubular welding wire embodiments from Tables 1 and 2. Elemental values are in weight percent relative to the total weight of the weld deposit. Weld deposits were formed using the following parameters: Multipass (5-6 layers); DCEP; Electrical Stickout: 0.75 in.-1 in.; Travel Speed: 8-12 inches per minute; Angle: 45°; Position: 1 g.

| | Welding Wire | | | | | |
|---|---|---|---|---|---|---|
| | E71T1-GC | | E70T1-GC | E70T1-GM | | E71T1-GM |
| Parameters | | | | | | |
| Specification | A5.36 | A5.29 | A5.29 | A5.29 | A5.29 | A5.29 |
| Base Plate | A537 | A36 | A36 | A529 | A36 | A36 |
| Shielding Gas | $CO_2$ | $CO_2$ | $CO_2$ | 75% Ar 25% $CO_2$ | 75% Ar 25% $CO_2$ | 75% Ar 25% $CO_2$ |
| Wire Diameter | 0.045" | 1/16" | 3/32" | 3/32" | 1/16" | 0.045" |
| Wire Feed Speed (in/min) | 450 | 250 | 200 | 200 | 250 | 450 |
| Properties | | | | | | |
| UTS (kpsi) | 76.3 | 74.8 | 77 | 79.4 | 77.3 | 77.4 |
| YS (kpsi) | 68.6 | 66.8 | 66.8 | 66.9 | 68.3 | 68.3 |
| % Elongation | 27.3 | 27.2 | 25.5 | 22.4 | 27.8 | 26.5 |
| CVN (ft. lbs. at −20° C.) | 80.3 | 60.0 | 46.0 | 39.0 | 63.3 | 65.0 |
| CVN (ft. lbs. at −40° C.) | 67.0 | 24.7 | 31.0 | 24.7 | 54.3 | 61.3 |

TABLE 3-continued

Example all-weld-metal analyses and mechanical test results for weld deposits
formed using the indicated tubular welding wire embodiments from Tables 1 and 2.
Elemental values are in weight percent relative to the total weight of the weld deposit.
Weld deposits were formed using the following parameters: Multipass (5-6 layers);
DCEP; Electrical Stickout: 0.75 in.-1 in.; Travel Speed: 8-12 inches per minute; Angle:
45°; Position: 1 g.

| | Welding Wire | | | | | |
|---|---|---|---|---|---|---|
| | E71T1-GC | | E70T1-GC | E70T1-GM | E71T1-GM | |
| Chemistry | | | | | | |
| Carbon | 0.032 | 0.042 | 0.052 | 0.039 | 0.041 | 0.045 |
| Manganese | 0.183 | 0.186 | 0.205 | 0.162 | 0.187 | 0.17 |
| Phosphorus | 0.01 | 0.011 | 0.007 | 0.006 | 0.01 | 0.01 |
| Sulfur | 0.007 | 0.007 | 0.006 | 0.009 | 0.007 | 0.007 |
| Silicon | 0.548 | 0.511 | 0.567 | 0.578 | 0.602 | 0.57 |
| Copper | 0.012 | 0.039 | 0.069 | 0.054 | 0.027 | 0.024 |
| Chromium | 0.026 | 0.03 | 0.029 | 0.032 | 0.025 | 0.027 |
| Vanadium | 0.013 | 0.012 | 0.008 | 0.009 | 0.013 | 0.011 |
| Nickel | 1.523 | 1.441 | 1.603 | 1.68 | 1.604 | 1.891 |
| Molybdenum | 0.005 | 0.007 | 0.007 | 0.011 | 0.055 | 0.004 |
| Aluminum | 0.004 | 0.004 | 0.013 | 0.009 | 0.008 | 0.012 |
| Titanium | 0.03 | 0.03 | 0.023 | 0.019 | 0.03 | 0.024 |
| Niobium | 0.011 | 0.009 | 0.006 | 0.007 | 0.009 | 0.009 |
| Cobalt | 0.003 | 0.004 | 0.004 | 0.004 | 0.004 | 0.004 |
| Boron | 0.0002 | 0.0003 | 0.0003 | 0.0004 | 0.0005 | 0.001 |
| Tungsten | 0.004 | 0.007 | 0.001 | 0.001 | 0.001 | 0.003 |
| Tin | 0.003 | 0.004 | 0.005 | 0.004 | 0.004 | 0.004 |
| Lead | 0.001 | 0.001 | N/A | 0.001 | 0.002 | 0.001 |
| Zirconium | 0.003 | 0.002 | 0.001 | 0.002 | 0.002 | 0.004 |
| Antimony | 0.001 | 0.001 | 0.001 | 0.002 | 0.001 | 0.001 |
| Arsenic | 0.003 | 0.003 | 0.003 | 0.004 | 0.004 | 0.003 |

Figure 3:
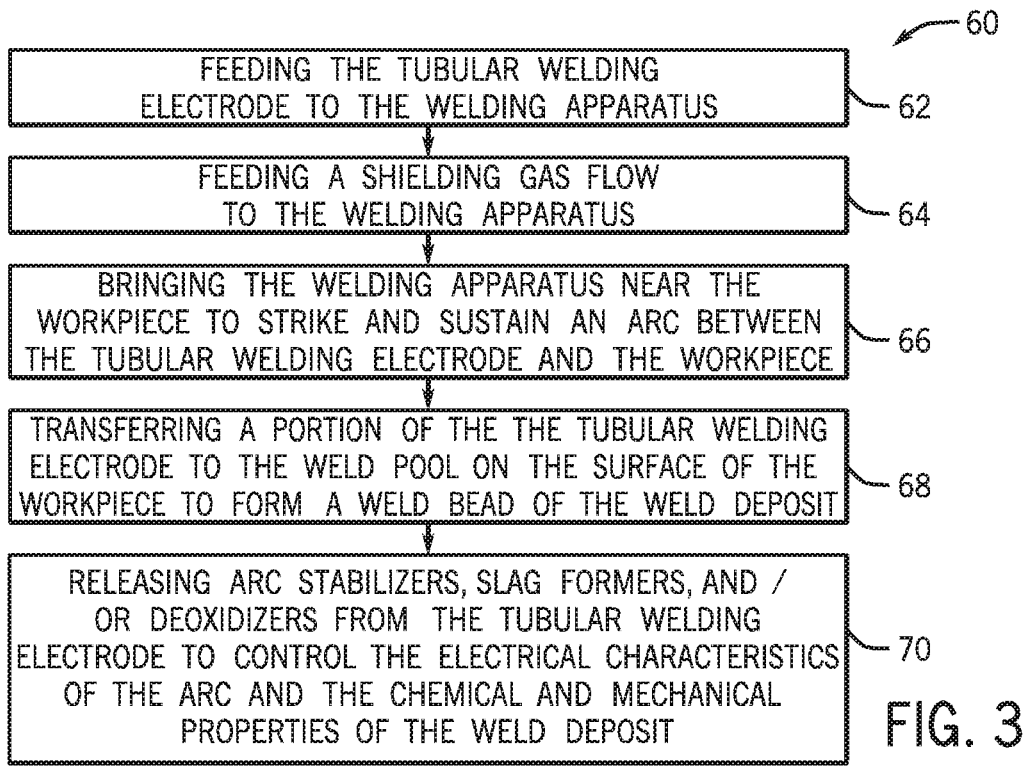
FIG. 3 is a process by which the tubular welding wire may be used to weld a workpiece, in accordance with embodiments of the present disclosure.

FIG. 3 illustrates an embodiment of a process 60 by which a workpiece 22 (e.g., a structural steel workpiece) may be welded using the disclosed welding system 10 and tubular welding wire 50. The illustrated process 60 begins with feeding (block 62) the tubular welding electrode 50 (i.e., the tubular welding wire 50) to a welding apparatus (e.g., welding torch 18). Additionally, the process 60 includes providing (block 64) a shielding gas flow (e.g., 100% argon, 100% $CO_2$, 75% argon/25% $CO_2$, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., carbonates) of the tubular welding electrode 50 may decompose to provide a shielding gas component (e.g., carbon dioxide).

Continuing through the process 60, next, the tubular welding electrode 50 may be brought near (block 66) the workpiece 22 to strike and sustain an arc 34 between the tubular welding wire 50 and the workpiece 22. It should be appreciated that the arc 34 may be produced using, for example, a DCEP, DCEN, DC variable polarity, pulsed DC, balanced or unbalanced AC power configuration for the GMAW system 10. Once the arc 34 has been established to the workpiece 22, a portion of the tubular welding electrode 50 (e.g., filler metals and alloying components) may be transferred (block 68) into the weld pool on the surface of the workpiece 22 to form a weld bead of a weld deposit. Meanwhile, the remainder of the components of the tubular welding electrode 50 may be released (block 70) from the tubular welding electrode 50 to serve as arc stabilizers, slag formers, and/or deoxidizers to control the electrical characteristics of the arc and the resulting chemical and mechanical properties of the weld deposit.

Certain embodiments of the tubular welding wire 50 may provide fume generation rates similar to those set forth in Table 4 below. As set forth in Table 4, in certain embodiments, the tubular welding wire 50 may enable a fume generation rate less than approximately 1.2 g/min, less than approximately 0.6 grams per minute (g/min), less than approximately 0.5 g/min, less than approximately 0.4 g/min, or less than approximately 0.3 g/min with melt rates at high as approximately 15 pounds per hour (lbs/hr). As such, in certain embodiments, the tubular welding wire 50 are designed such that less than 1 wt %, less than approximately 0.85 wt %, less than approximately 0.6 wt %, less, than approximately 0.5 wt %, less than approximately 0.4 wt %, less than approximately 0.3 wt %, or less than approximately 0.2 wt % of the tubular welding wire 50 is converted into fumes during the welding operation. Accordingly, the disclosed tubular welding wire 50 is capable of providing these low fume generation rates (e.g., less than 0.4 g/min) and low electrode fume conversions (e.g., less than approximately 1 wt %, less than approximately 0.4 wt %) at any suitable melt rate (e.g., between approximately 3 lbs/hr and approximately 15 lbs/hr).

Further, as indicated in Table 5, in certain embodiments, the tubular welding wire 50 may enable a welding fume having less than approximately 7 wt %, less than approximately 5 wt %, less than approximately 4 wt %, less than approximately 3 wt %, less than approximately 2 wt % manganese. In certain embodiments, the tubular welding wire 50 may enable a welding fume having less than approximately 1 wt %, less than approximately 0.75 wt %, less than approximately 0.6 wt %, less than approximately 0.5 wt %, or less than approximately 0.25 wt % nickel.

TABLE 4

Fume generation testing according to AWS F1.2 for embodiments of the disclosed tubular welding wire 50.

| | Welding Wire | | | | | |
|---|---|---|---|---|---|---|
| | E70T1-GC | E70T1-GM | | | | |
| Amps | 460 | 360 | 430 | 480 | 480 | 550 |
| Volts | 30 | 28 | 25.5 | 29 | 28 | 28 |
| Wire feed speed (in/min) | 200 | 350 | 155 | 200 | 200 | 250 |
| Current | DCEP | DCEP | DCEP | DCEP | DCEP | DCEP |
| Shielding Gas | $CO_2$ | 75% Ar 25% $CO_2$ | 90% Ar 10% $CO_2$ | 75% Ar 25% $CO_2$ | 90% Ar 10% $CO_2$ | 90% Ar 10% $CO_2$ |
| Melt Rate (lbs/hr) | 18.87 | 15.49 | 14.6 | 18.8 | 18.8 | 23.5 |
| Fume generation rate (g/min) | 1.21 | 0.36 | 0.39 | 0.28 | 0.25 | 0.36 |
| wt % wire converted to fume | 0.85 | 0.31 | 0.36 | 0.2 | 0.17 | 0.2 |

TABLE 5

Elemental analysis of welding fumes for two embodiments of the disclosed tubular welding wire 50 in accordance with AWS A5.29.

| Welding Wire | E70T1-GM | E71T1-GM |
|---|---|---|
| Shielding Gas | 90% Ar/10% $CO_2$ | 75% Ar/25% $CO_2$ |
| Iron | 28 | 45 |
| Manganese | 2.4 | 1.8 |
| Nickel | 0.21 | 0.52 |

Figure 4:
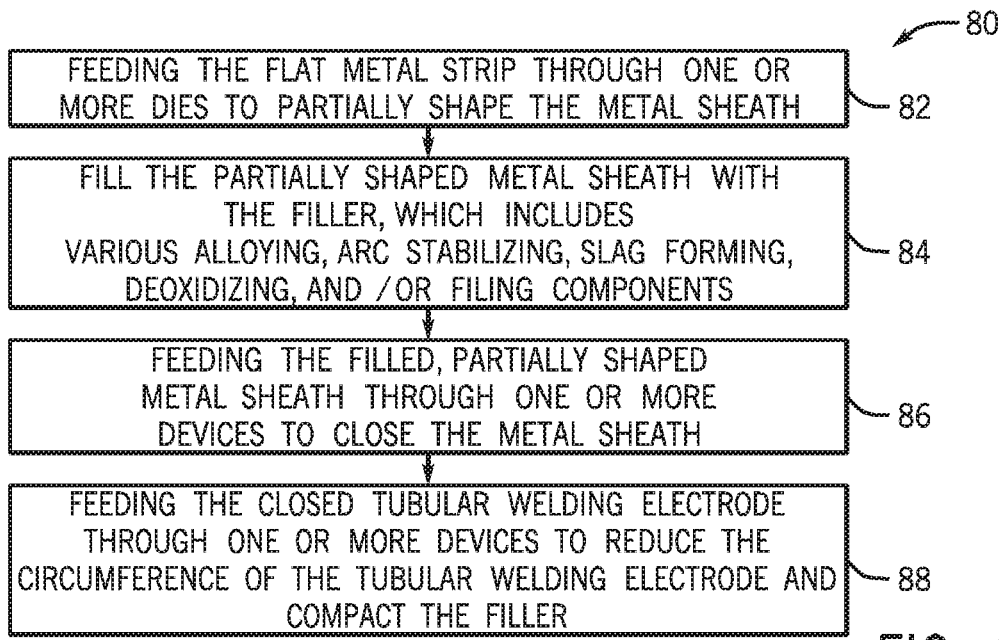
FIG. 4 is a process for manufacturing the tubular welding wire, in accordance with embodiments of the present disclosure.

FIG. 4 illustrates an embodiment of a process 80 by which the tubular welding wire 50 may be manufactured. It may be appreciated that the process 80 merely provides an example of manufacturing a tubular welding wire 50; however, in other embodiments, other methods of manufacturing may be used to produce the tubular welding wire 50 without spoiling the effect of the present approach. That is, for example, in certain embodiments, the tubular welding wire 50 may be formed via a roll-forming method or via packing the core composition into a hollow metallic sheath. The illustrated process 80 begins with a flat metal strip being fed (block 82) through a number of dies that shape the strip into a partially circular metal sheath 52 (e.g., producing a semicircle or trough). After the metal strip has been at least partially shaped into the metal sheath 52, it may be filled (block 84) with the filler (i.e., the granular core 54), such as the formulations for the granular core 54 filler discussed with respect to Table 2. That is, the partially shaped metal sheath 52 may be filled with various powdered alloying, arc stabilizing, slag forming, deoxidizing, and/or filling components. In certain embodiments, the disclosed tubular welding wire 50 may be completely free or substantially free of manganese or may be a low manganese welding wire (e.g., 1 wt % or less, 0.5 wt % or less, 0.35 wt % or less, 0.25 wt % or less, 0.2 wt % or less, or 0.15 wt % or less total Mn content). In other embodiments, the granular core 54 of the tubular welding wire 50 may be completely free or substantially free of manganese, and only the metal sheath 52 includes (e.g., less than approximately 0.4 wt %, less than approximately 0.3 wt %, less than approximately 0.25 wt %, less than approximately 0.2 wt %, or only trace amounts) manganese.

Continuing through the process 80, once the components of the granular core material 54 have been added to the partially shaped metal sheath 52, the partially shaped metal sheath 52 may then be fed through (block 86) one or more devices (e.g., drawing dies or other suitable closing devices) that may generally close the metal sheath 52 such that it substantially surrounds the granular core material 54 (e.g., forming a seam 58). Additionally, the closed metal sheath 52 may subsequently be fed through (block 88) a number of devices (e.g., drawing dies or other suitable devices) to reduce the circumference of the tubular welding wire 50 by compressing the granular core material 54.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding consumable, comprising a metallic sheath surrounding a granular core, wherein the welding consumable comprises:
   approximately 0.35 wt % or less manganese based on the weight of the welding consumable;
   between approximately 0.1 wt % and approximately 3 wt % nickel based on the weight of the welding consumable;
   wherein the granular core comprises:
   between approximately 2.5 wt % and approximately 10 wt % calcined rutile based on the weight of the welding consumable; and
   between approximately 0.1 wt % and approximately 2 wt % spodumene based on the weight of the welding consumable.

2. The welding consumable of claim 1, wherein the granular core is substantially free of manganese and compounds of manganese.

3. The welding consumable of claim 2, wherein the metallic sheath of the welding consumable comprises between approximately 0.02 wt % and approximately 0.35 wt % manganese based on the weight of the metallic sheath.

4. The welding consumable of claim 3, wherein the metallic sheath comprises approximately 0.2 wt % manganese based on the weight of the metallic sheath.

5. The welding consumable of claim 1, wherein the welding consumable comprises 0.3 wt % manganese or less based on the weight of the welding consumable.

6. The welding consumable of claim 1, wherein approximately 0.5 wt % or less of the nickel of the welding consumable is present within the metallic sheath of the welding consumable.

7. The welding consumable of claim 1, wherein the welding consumable comprises between approximately 1.5 wt % and approximately 1.9 wt % nickel based on the weight of the welding consumable.

8. The welding consumable of claim 1, wherein the welding consumable comprises between approximately 0.05 wt % and approximately 0.3 wt % potassium fluorosilicate based on the weight of the welding consumable.

9. The welding consumable of claim 1, wherein the welding consumable comprises between approximately 0.25 wt % and approximately 4 wt % sodium titanate frit based on the weight of the welding consumable.

10. The welding consumable of claim 1, wherein the welding consumable comprises between approximately 0.05 wt % and approximately 0.25 wt % lithium carbonate based on the weight of the welding consumable.

11. The welding consumable of claim 1, wherein the welding consumable comprises between approximately 0.2 wt % and approximately 1 wt % spodumene based on the weight of the welding consumable.

12. The welding consumable of claim 1, wherein the welding consumable comprises between approximately 0.25 wt % and approximately 0.75 wt % nepheline syenite based on the weight of the welding consumable.

13. The welding consumable of claim 1, wherein the welding consumable comprises between approximately 0.5 wt % and approximately 1.5 wt % silica sand based on the weight of the welding consumable.

14. The welding consumable of claim 1, wherein the welding consumable comprises between approximately 0.1 wt % and approximately 0.25 wt % wallastonite based on the weight of the welding consumable.

15. The welding consumable of claim 1, wherein the welding consumable comprises between approximately 3 wt % and approximately 8 wt % calcined rutile based on the weight of the welding consumable.

16. The welding consumable of claim 1, wherein the welding consumable comprises between approximately 1 wt % and approximately 4 wt % ferro-silicon powder based on the weight of the welding consumable.

17. The welding consumable of claim 1, wherein the welding consumable comprises between approximately 0.001 wt % and approximately 0.5 wt % aluminum powder based on the weight of the welding consumable.

18. The welding consumable of claim 1, wherein the welding consumable comprises between approximately 0.15 wt % and approximately 1.2 wt % magnesium based on the weight of the welding consumable.

19. The welding consumable of claim 1, wherein the welding consumable comprises between approximately 0.1 wt % and approximately 0.8 wt % ferro-zirconium-silicon powder based on the weight of the welding consumable.

20. A method of forming a weld deposit on a structural steel workpiece, comprising:
feeding a tubular welding wire toward the structural steel workpiece, wherein the structural steel workpiece comprises carbon steel, mild steel, low-alloy steel, or a combination thereof, and wherein the tubular welding wire comprises a metallic sheath surrounding a granular core, and further comprises:
approximately 0.35 wt % or less manganese based on the weight of the tubular welding wire;
between approximately 0.1 wt % and approximately 3 wt % nickel based on the weight of the tubular welding wire;
wherein the granular core comprises:
between approximately 2.5 wt % and approximately 10 wt % calcined rutile based on the weight of the tubular welding wire; and
between approximately 0.1 wt % and approximately 2 wt % spodumene based on the weight of the tubular welding wire; and
forming the weld deposit on the structural steel workpiece using the tubular welding wire, wherein the weld deposit comprises approximately 0.35 wt % manganese or less based on the weight of the weld deposit.

21. The method of claim 20, wherein the weld deposit comprises:
between approximately 0.005 wt % and 0.2 wt % manganese; and
between approximately 0.1 wt % and approximately 3 wt % nickel.

22. The method of claim 20, wherein the weld deposit has an ultimate tensile strength (UTS) of at least approximately 70 kilopounds per square inch (kpsi).

23. The method of claim 20, wherein the weld deposit has a Charpy V-notch toughness (CVN) of at least approximately 20 foot-pounds (ft-lbs) at −20° F. and at least approximately 20 ft-lbs at −40° F.

24. The method of claim 20, wherein less than approximately 1% of the tubular welding wire is converted to welding fumes during the welding operation while a melt rate of the welding operation is between approximately 3 and approximately 15 pounds per hour.

25. The method of claim 24, wherein less than approximately 0.4% of the tubular welding wire is converted to welding fumes during the welding operation while a melt rate of the welding operation is between approximately 3 and approximately 15 pounds per hour.

26. The method of claim 24, wherein the welding fumes comprise approximately 3% or less manganese and approximately 1% or less nickel based on the weight of the welding fumes.

* * * * *